United States Patent
Oldani

(10) Patent No.: US 10,112,348 B2
(45) Date of Patent: Oct. 30, 2018

(54) FIBER PLACEMENT SYSTEM

(71) Applicant: Tino Oldani, Rockford, IL (US)

(72) Inventor: Tino Oldani, Rockford, IL (US)

(73) Assignee: Ingersoll Machine Tools, Inc., Rockford, IL (US)

( * ) Notice: Subject to any disclaimer, the term of this patent is extended or adjusted under 35 U.S.C. 154(b) by 324 days.

(21) Appl. No.: 15/047,428

(22) Filed: Feb. 18, 2016

(65) Prior Publication Data

US 2016/0257078 A1 Sep. 8, 2016

Related U.S. Application Data

(60) Provisional application No. 62/126,828, filed on Mar. 2, 2015.

(51) Int. Cl.
*B29C 70/38* (2006.01)
*B29C 70/32* (2006.01)
*B29K 105/08* (2006.01)

(52) U.S. Cl.
CPC .............. *B29C 70/38* (2013.01); *B29C 70/32* (2013.01); *B29C 70/382* (2013.01); *B29C 70/386* (2013.01); *B29K 2105/089* (2013.01); *B29K 2105/0872* (2013.01); *B29K 2105/0881* (2013.01); *Y10T 156/1348* (2015.01); *Y10T 156/1788* (2015.01)

(58) Field of Classification Search
CPC ......... B29C 70/30; B29C 70/32; B29C 70/38; B29C 70/382; B29C 70/384; B29C 70/386; B29C 70/388; B29K 2105/0872; B29K 2105/0881; B29K 2105/089; Y10T 156/1348; Y10T 156/1788
See application file for complete search history.

(56) References Cited

U.S. PATENT DOCUMENTS

| | | | |
|---|---|---|---|
| 2006/0162143 A1 | 7/2006 | Nelson et al. | |
| 2010/0006202 A1 | 1/2010 | Schendel et al. | |
| 2012/0035754 A1* | 2/2012 | Oldani | B23Q 3/15506 700/96 |
| 2014/0202640 A1* | 7/2014 | Vaniglia | B29C 70/38 156/538 |
| 2014/0322023 A1 | 10/2014 | Tapia | |

* cited by examiner

*Primary Examiner* — Carson Gross

(74) *Attorney, Agent, or Firm* — Reinhart Boerner Van Deuren P.C.

(57) ABSTRACT

A fiber placement system is provided. The fiber placement system provides a plurality of working zones relative to a common gantry system. Such a configuration permits for the use of one working zone while another working zone is loaded/unloaded with parts. Also provided is a method for manufacturing composite parts using a fiber placement system having a plurality of working zones arranged relative to a common gantry.

20 Claims, 3 Drawing Sheets

FIBER PLACEMENT SYSTEM

CROSS-REFERENCE TO RELATED PATENT APPLICATIONS

This patent application claims the benefit of U.S. Provisional Patent Application No. 62/126,828, filed Mar. 2, 2015, the entire teachings and disclosure of which are incorporated herein by reference thereto.

FIELD OF THE INVENTION

This invention generally relates to manufacturing equipment, and more specifically to fiber placement machinery.

BACKGROUND OF THE INVENTION

Automated fiber placement machines are nowadays widely used to manufacture parts, components, and structures from composite materials. These systems typically comprise a fiber placement head carried out in space by a multi-axis positioner, with the head responsible for laying up carbon fiber composite onto a stationary mold.

The materials used in automated fiber placement heads are typically composed of unidirectional carbon fibers pre-impregnated into a resin that appears as tapes, or thin strips, commonly known as "tows."

Each head is usually capable of laying and compacting a plurality of tows of a determined dimension (such as ⅛", ⅜", ½", etc.) arranged side-by-side to form a "ply" or "course" over and onto a tool. The head usually has all means to lay-up the tows/tape automatically such as a compaction roller, means to individually cut or add each tow whenever required, as well as means to heat up the tows/tape and/or the substrate zone to ensure sufficient tack for tow/tape adhesion. The head is also automatically fed by an integrated tow magazine (referred to as a "creel") which supplies the tow/tape in an organized array and with a correct tension.

In order to achieve flexibility, usually a CNC controlled positioner is capable of selectively and automatically picking up a desired head—creel assembly from a magazine and under instructions provided by suitable control means is capable of following a desired multiple-pass lay-up path onto a stationary or rotating mold duly anchored to ground.

One of the most common positioner arrangements adopted is a gantry-type of machine travelling above a single working envelope located within the gantry travelling columns and extending longitudinally along the X-axis of the machine.

One restricted portion of the positioner working area is usually used by the positioner to access to the heads' magazine. Such a configuration, while recognized as allowing for the manufacture of parts within the working envelope, is limited to that single envelope. As a result, as parts are loaded and unloaded from the working envelope, the machine is idle. Unfortunately, this machine down time has led to inefficiencies, especially considering the growing demand for the rapid production of composite parts. As such, there is a need in the art for a fiber placement system with greater efficiency.

The invention provides such a fiber placement system and method. These and other advantages of the invention, as well as additional inventive features, will be apparent from the description of the invention provided herein.

BRIEF SUMMARY OF THE INVENTION

In one aspect, embodiments of the invention provide a fiber placement system that utilizes a plurality of working zones relative to a common gantry.

In another aspect, embodiments of the invention provide a method for manufacturing composite parts using a fiber placement system having a plurality of working zones arranged relative to a common gantry.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Various embodiments of an automatic fiber placement system ("AFPS") having a gantry-type positioner capable of operating in multiple working zones are provided. The AFPS is thus able to operate at a higher level of flexibility and efficiency. However, as will be recognized by those skilled in the art from the following description, such embodiments are provided by way of example only, not by way of limitation, and that all alternative embodiments are reserved herein.

Figure 1:
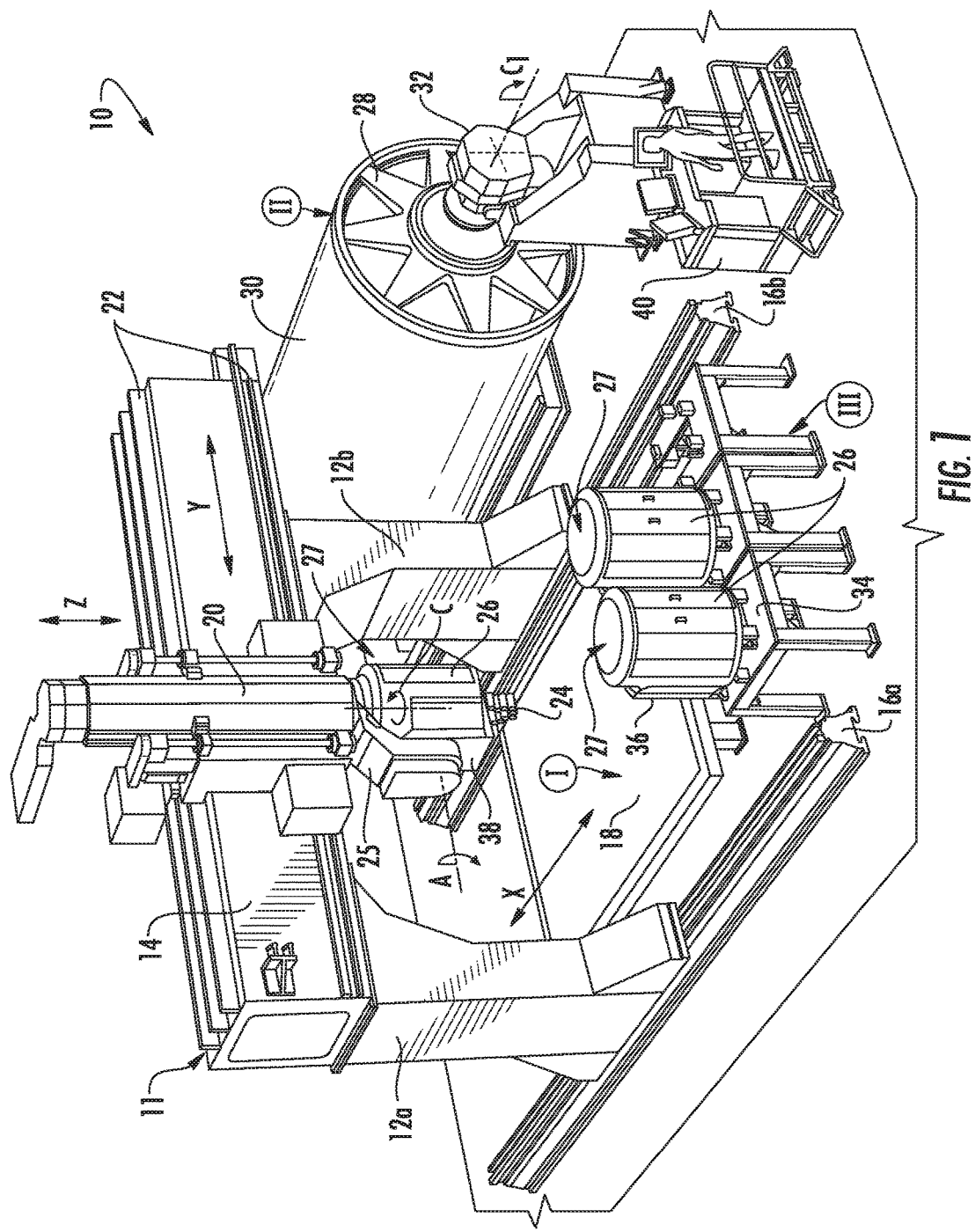
FIG. 1 shows a tridimensional view of an exemplary embodiment of an Automatic Fiber Placement System ("AFPS") according to the present invention with the head ready to operate in working zone I.

An embodiment of an AFPS 10 is provided in FIG. 1. The AFPS 10 features a gantry-type positioner 11. The gantry-type positioner 11 generally includes two columns 12a, 12b supporting a cross-rail 14. The columns 12a, 12b travel along tracks 16a, 16b. The tracks 16a, 16b defines a linear axis of travel X for the gantry-type positioner 11. Disposed on the linear axis X is a first working zone I. As depicted in FIG. 1, the working zone I includes a planar mold 18.

Figure 2:
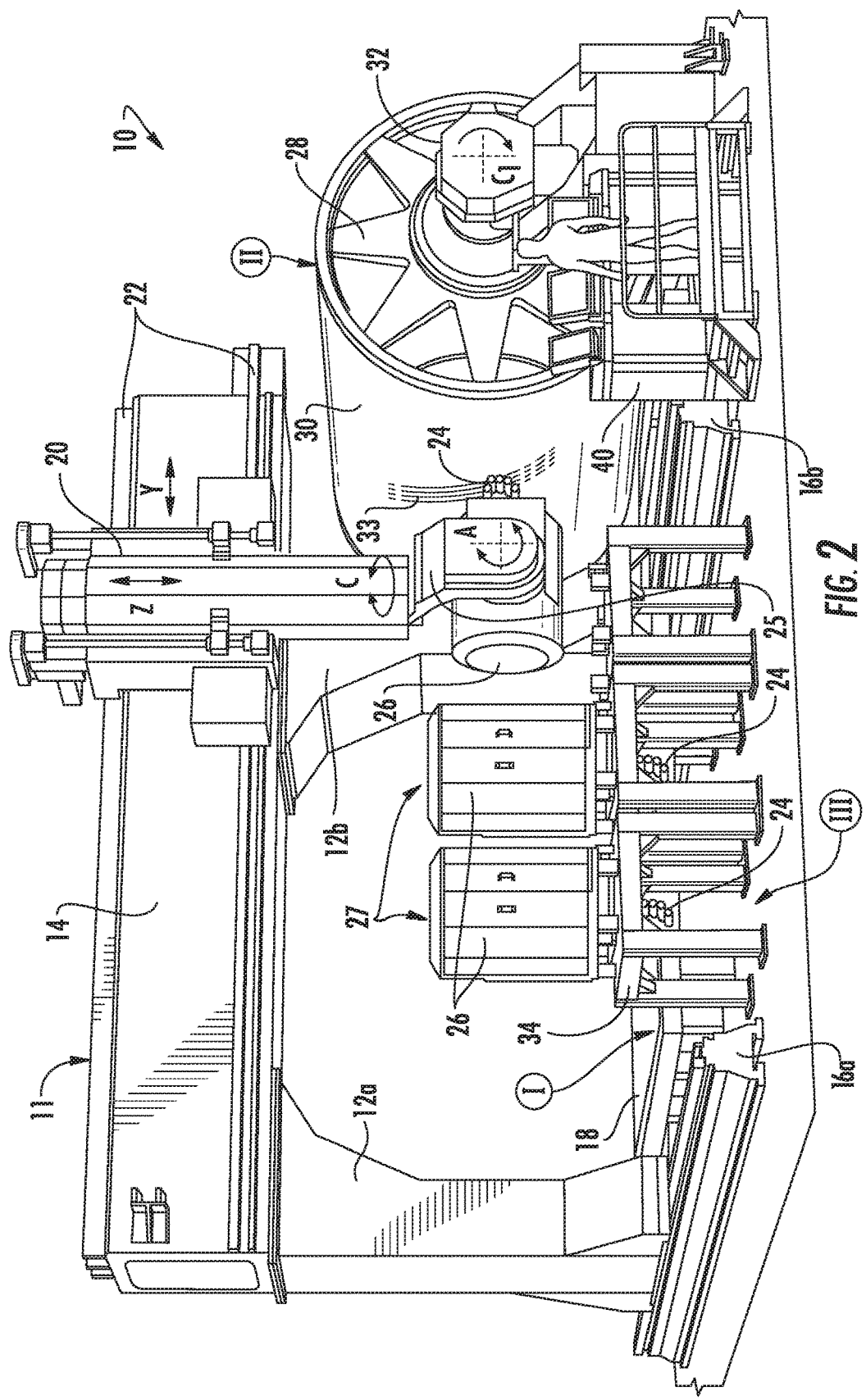
FIG. 2 shows a tridimensional view of the AFPS of FIG. 1 with the head ready to operate in working zone II.
Figure 3:
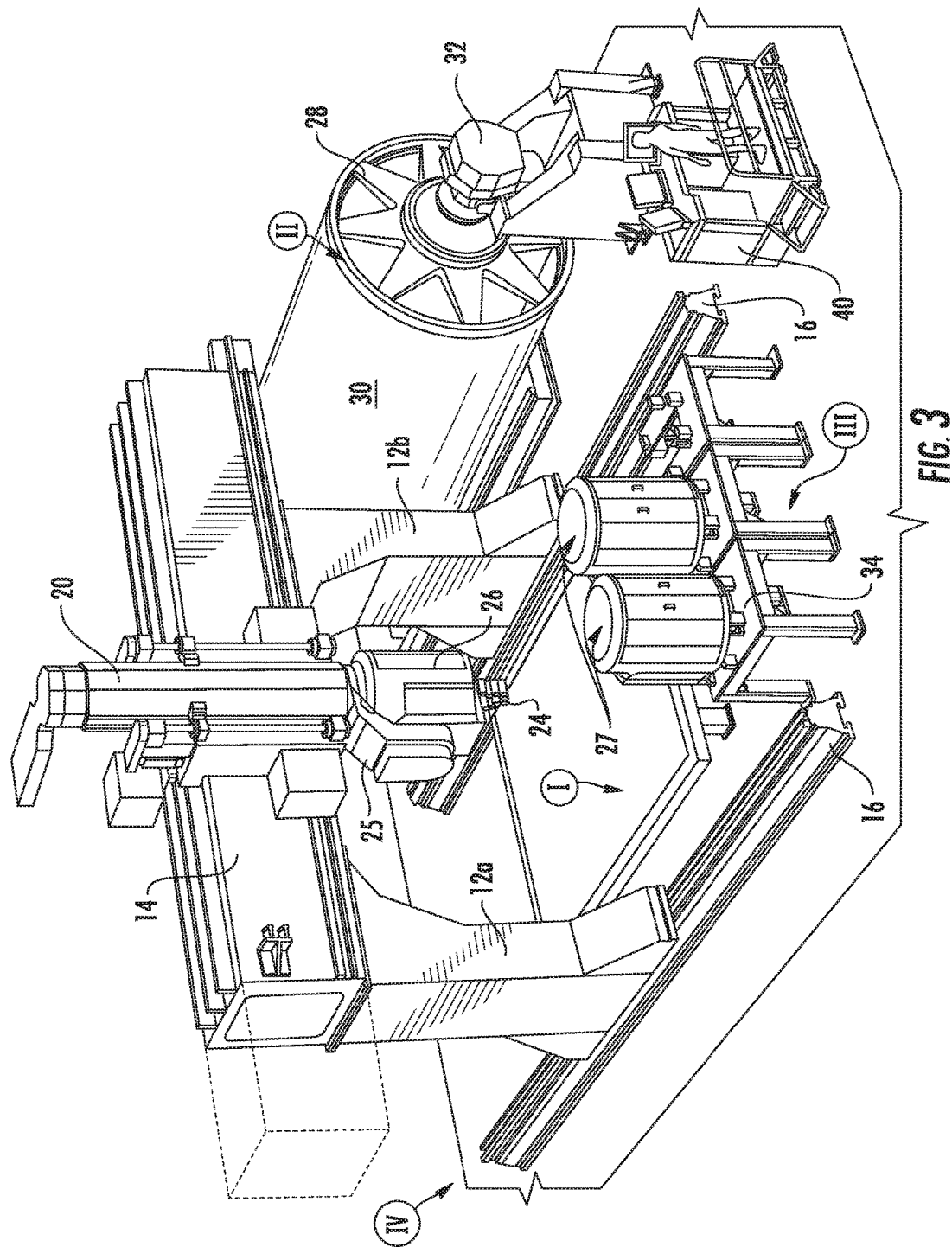
FIG. 3 shows a tridimensional view of the AFPS of FIG. 1 according to an alternative embodiment of FIG. 1, featuring a third working zone III, and a fourth working zone IV.

A vertical ram 20 is provided on the cross-rail 14. The ram 20 travels along a track 22 that extends along a substantial portion of the cross-rail 14. In embodiments, the track 22 extends beyond the cross-rail 14 as shown in FIGS. 1-3. The track 22, thus, defines a second linear axis of travel Y for the ram 20. As shown in FIG. 1, the cross-rail 14 extends past column 12b to position the ram 20 in a second working zone II.

The ram 20 provides vertical movement for a fiber placement head 24 along a third linear axis of travel Z. Additionally, a machine wrist 25 operably coupled to the ram 20 provides a first rotational axis A that is perpendicular to the third linear axis Z. The machine wrist 25 also provides rotation about the third linear axis Z as shown by curved path C.

The fiber placement head 24 is provided with fiber from a creel 26. The creel 26 can be a climate controlled environment in certain embodiments, and the creel 26 stores a plurality of spools of fiber tow. Within the creel 26 are further components that assist in dispensing and directing the fiber tows to the fiber placement head 24. The fiber tows have a width of, for example, ¼ inch to ⅜ inch, although any tow size is entirely possible. In an embodiment, the fiber placement head 24 and the creel 26 are part of a single modular assembly 27 such that the fiber tows can be quickly and easily replenished or exchanged during operation.

The fiber placement head 24 performs the necessary operations to the fiber tows or mold to layup (also referred to as lay down) the fiber tows onto the mold (such as the planar mold 18). The fiber placement head 24 typically includes a compaction roller and other components used for fiber lay-up which may include heaters for heating the tows or the mold, visual inspection devices, tow cutters, etc. These additional components need not necessarily be part of the fiber placement head 24 and could be included as part of other structures, for instance, adjacent to the fiber placement head 24 or creel 26.

The gantry-type positioner 11 moves along the first linear axis X and the ram 20 moves along the second linear axis Y to position the fiber placement head 24 over the mold 18 in the first working zone I. The ram 20 moves the fiber placement head 24 along the third linear axis Z to layup the fiber tows on the mold 18. During fiber layup, movement of the wrist 25 to provide rotation about the first rotational axis A and/or about the linear axis Z along path C may also be required such as for curved molds or for diagonal placement of the fiber on a mold. The fiber placement head 24 is manipulated in this way until the molded composite structure is complete.

Conventionally, once the molded composite structure is complete, the gantry-type positioner would be idle while the working zone I is prepared for a new molded composite structure. However, using the present AFPS 10, the ram 20 can be moved along the second linear axis Y parallel to the cross-rail 14 to the region outside the column 12b to the second working zone II as shown in FIG. 2.

In FIG. 2, the second working zone II is a rotating mandrel 28 with a layup surface 30. The rotating mandrel 28 has a headstock region 32 that provides rotation about a second rotational axis $C_1$ that is parallel to the first linear axis X As can be seen in FIG. 2, the fiber placement head 24 has been rotated via the machine wrist 25 about the first rotational axis A to apply fiber tows 33 to the layup surface 30. The rotating mandrel 28 can be used to produce large composite parts such as, for instance, for a fuselage. As with the first working zone I, the rotating mandrel 28 can be loaded and unloaded while the fiber placement head 24 is operating in the first working zone I. Thus, providing just these two working zones I, II increases manufacturing flexibility of the AFPS 10 having a single gantry-type positioner 10.

However, further enhancements to manufacturing efficiency and flexibility can be achieved by adding additional working zones. As shown in FIGS. 1 and 2, a third working zone III is provided along the first linear axis X spatially disposed from the first working zone I. As depicted, the third working zone III provides multiple storage cradles 34 for additional modular assemblies 27 and/or other tools. Referring to FIG. 1, each modular assembly 27 has a clamping flange 36 that engages a clamping plate 38 on the machine wrist 25. In this way, the modular assemblies 27 can be easily exchanged to replenish or replace the fiber tows, or the modular assembly 27 can be replaced with a different tool, such as a finishing tool, router, etc., to perform a different function on the composite material.

The fiber tows in the additional modular assemblies 27 of the storage cradle 34 can be the same or different than the fiber tows in the in-use modular assembly 27. The fiber tows can be different in size, thickness, or composition. For instance, the modular assemblies 27 in the storage cradle 34 can be thicker or thinner in width and/or thickness than the in-use modular assembly 27. Further, the additional modular assemblies 27 can have fibers tows containing fibers of different sizes or containing resins of different types. Moreover, the creel 26 of the modular assembly 27 can provide different climate controlled environments for the fiber tows. Accordingly, the geometry and structure of the fiber placement head 24 can also vary by modular assembly so as to provide a variety of heaters for heating the tows or the mold, visual inspection devices, tow cutters, and the like.

In a further embodiment depicted in FIG. 3, a fourth working zone IV is provided outside of the column 12a such that the cross rail 14 extends past both columns 12a, 12b along the second linear axis Y. Dashed lines are used in FIG. 3 to depict a the region of the cross rail 14 extending beyond the column 12a. The fourth working zone IV can provide any of a variety of suitable mold surfaces such as a horizontally or vertically arranged planar mold, a rotating mandrel, a concave or convex curved surface, etc.

Also, as shown in each of FIGS. 1-3, an operator platform 40 is provided to control the movement of the gantry-type positioner 11 between the working zones I, II, III, and IV.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An automatic fiber placement system, comprising:
a gantry including a cross rail between a first column and a second column, the cross rail extending past the second column;
a fiber placement head carried by the gantry;
wherein the gantry provides movement of the fiber placement head between at least a first working zone between the first and second columns and a second working zone located outside the second column;
wherein the first working zone is configured to provide a first mold structure;
wherein the second working zone is configured to provide a second mold structure;
wherein the fiber placement head is configured to apply fiber tows to the first mold structure when the fiber placement head is in the first working zone; and
wherein the fiber placement head is configured to apply fiber tows to the second mold structure when the fiber placement head is in the second working zone.

2. The automatic fiber placement system of claim 1, wherein the cross rail extends past the first column as well as the second column such that the gantry provides movement of the fiber placement head to a third working zone outside the first column.

3. The automatic fiber placement system of claim 1, wherein the gantry also provides movement of the fiber placement head to a plurality of storage cradles, each storage cradle being capable of holding a modular assembly including a fiber placement head and a creel.

4. The automatic fiber placement system of claim 3, wherein the plurality of storage cradles are located on a common axis with the first working zone and spatially disposed from the first working zone.

5. An automatic fiber placement system, comprising:
a gantry including a cross rail between a first column and a second column, the cross rail extending past the second column;
a fiber placement head carried by the gantry, the fiber placement head configured to apply fiber tows to a mold structure,
wherein the gantry provides movement of the fiber placement head between at least a first working zone between the first and second columns and a second working zone located outside the second column; and
wherein a mold structure located in the first working zone and a mold structure located in the second working zone are different.

6. The automatic fiber placement system of claim 5, wherein at least one mold structure is a rotating mandrel having a curved layup surface.

7. The automatic fiber placement system of claim 1, further comprising a ram operably connected to the cross rail and capable of movement parallel to the cross rail for at least the entire length of the cross-rail.

8. A system for fabricating composite parts, comprising:
a gantry including a cross rail supported between a first column and a second column, the cross rail extending past the second column;
a first mold structure located in a first working zone between the first column and the second column;
a second mold structure located in a second working zone outside the second column; and
a fiber placement head carried by the gantry and configured to apply fiber tows to at least the first and second mold structures.

9. The system of claim 8, wherein the second mold structure is a rotating mandrel including a curved layup surface.

10. The system of claim 8, wherein the cross rail also extends past the first column and the system further comprises a third mold structure located in a third working zone outside the first column.

11. The system of claim 8, further comprising a plurality of storage cradles, each storage cradle capable of holding a modular assembly including a fiber placement head and a creel.

12. A method for manufacturing composite parts, comprising the steps of:
using a fiber placement system having a plurality of working zones arranged relative to a common gantry, the gantry comprising a cross rail supported by a first column and a second column, the cross rail extending past the second column; and a fiber placement head carried by the gantry configured to apply fiber tows to a plurality of mold structures;
positioning the fiber placement head at a first mold structure in a first working zone between the first and second columns;
applying fiber tow to the first mold structure to form a first composite part;
repositioning the fiber placement head at a second mold structure in a second working zone outside the second column; and
applying fiber tow to the second mold structure to form a second composite part while the first composite part is unloaded from the first mold structure in the first working zone.

13. The method of claim 12, wherein the cross rail extends past the first column as well as the second column to provide a third working zone outside the first column.

14. The method of claim 12, wherein the fiber placement head is part of a modular assembly including a creel.

15. The method of claim 14, wherein a storage cradle having a plurality of modular assemblies is provided in one of the plurality of working zones.

16. The method of claim 15, further comprising the steps of moving the fiber placement head to the storage cradle and exchanging a first modular assembly for a second modular assembly prior to the step of repositioning the fiber placement head at a second mold structure.

17. The method of claim 16, wherein the second modular assembly has a different type of fiber tow than the first modular assembly.

18. The method of claim 12, wherein the first and second mold structures are used to create composite parts of different geometries.

19. The method of claim 18, wherein at least one of the first and second mold structures is a planar mold.

20. The method of claim 19, wherein at least one of the first and second mold structures is a rotating mandrel having a curved layup surface.

* * * * *